(12) United States Patent
Croxford et al.

(10) Patent No.: US 9,805,478 B2
(45) Date of Patent: Oct. 31, 2017

(54) COMPOSITING PLURAL LAYER OF IMAGE DATA FOR DISPLAY

(71) Applicant: ARM LIMITED, Cambridge (GB)

(72) Inventors: Daren Croxford, Swaffham Prior (GB); Sharjeel Saeed, Cambridge (GB); Kushan Vijaykumar Vyas, Cambridge (GB)

(73) Assignee: ARM Limited, Cambridge (GB)

( * ) Notice: Subject to any disclaimer, the term of this patent is extended or adjusted under 35 U.S.C. 154(b) by 39 days.

(21) Appl. No.: 15/067,683

(22) Filed: Mar. 11, 2016

(65) Prior Publication Data

US 2016/0217592 A1 Jul. 28, 2016

Related U.S. Application Data

(63) Continuation-in-part of application No. 14/309,487, filed on Jun. 19, 2014, now Pat. No. 9,472,008.

(30) Foreign Application Priority Data

Aug. 14, 2013 (GB) .................................. 1314556.0

(51) Int. Cl.
*G06T 11/00* (2006.01)
*G06T 1/20* (2006.01)
(Continued)

(52) U.S. Cl.
CPC ................ *G06T 11/00* (2013.01); *G06T 1/20* (2013.01); *G06T 1/60* (2013.01); *G06T 11/40* (2013.01);
(Continued)

(58) Field of Classification Search
None
See application file for complete search history.

(56) References Cited

U.S. PATENT DOCUMENTS

| 5,638,499 A | 6/1997 | O'Connor et al. |
| 5,867,166 A | 2/1999 | Myhrvold et al. |

(Continued)

FOREIGN PATENT DOCUMENTS

| CN | 86105001 | 4/1987 |
| CN | 102937892 | 2/2013 |

(Continued)

OTHER PUBLICATIONS

Search Report for GB Application No. 1314556.0, dated Feb. 24, 2013, 3 pages.

(Continued)

*Primary Examiner* — Edward Martello
(74) *Attorney, Agent, or Firm* — Nixon & Vanderhye P.C.

(57) ABSTRACT

Apparatus and a corresponding method for processing image data are provided. The apparatus has compositing circuitry to generate a composite layer for a frame for display from image data representing plural layers of content within the frame. Plural latency buffers are provided to store at least a portion of the image data representing the plural layers. At least one of the plural latency buffers is larger than at least one other of the plural latency buffers. The compositing circuitry is responsive to at least one characteristic of the plural layers of content to allocate the plural layers to respective latency buffers of the plural latency buffers. Image data information for a layer allocated to the larger latency buffer is available for analysis earlier than that of the layers allocated to the smaller latency buffers and processing efficiencies can then result.

25 Claims, 8 Drawing Sheets

(51) Int. Cl.
    *G06T 1/60* (2006.01)
    *G06T 11/40* (2006.01)
    *G06T 11/60* (2006.01)
    *G06T 15/00* (2011.01)

(52) U.S. Cl.
    CPC ............ *G06T 11/60* (2013.01); *G06T 15/005* (2013.01); *G06T 2210/32* (2013.01); *G06T 2210/62* (2013.01)

(56) References Cited

U.S. PATENT DOCUMENTS

| | | | |
|---|---|---|---|
| 8,390,635 B2* | 3/2013 | MacInnis | G06T 9/00 345/536 |
| 8,477,143 B2* | 7/2013 | Harper | G06F 3/038 345/522 |
| 2007/0040851 A1 | 2/2007 | Brunner et al. | |
| 2013/0063473 A1 | 3/2013 | Pelton et al. | |
| 2014/0072244 A1 | 3/2014 | Cheng et al. | |

FOREIGN PATENT DOCUMENTS

| | | |
|---|---|---|
| EP | 0 961 230 | 12/1999 |
| TW | 200416623 | 9/2004 |
| TW | 200609842 | 3/2006 |

OTHER PUBLICATIONS

Khan, M.H. et al., "Bandwidth-efficient Display Controller for Low Power Devices in Presence of Occlusion", IEEE, (2007), Jan. 10-14, 2007, 2 pages.
International Search Report and Written Opinion of the International Searching Authority dated Sep. 22, 2014 in PCT/GB2014/051847, 10 pages.
Ford et al., "Colour Space Conversions", Aug. 1998; 31 pages; distributed and passively maintained by Charles Poynton (poynton@poynton.com).
Taiwanese Office Action dated Aug. 22, 2017 in TW 103124290 and English translation, 6 pages.

* cited by examiner

COMPOSITING PLURAL LAYER OF IMAGE DATA FOR DISPLAY

This application is a Continuation-in-Part of U.S. application Ser. No. 14/309,487, filed Jun. 19, 2014, which claims priority to GB Patent Application No. 1314556.0, filed Aug. 14, 2013, the entire contents of each of which are hereby incorporated by reference.

TECHNICAL FIELD

The present disclosure relates to image processing. More particularly, it relates to compositing plural layers of image data for display.

BACKGROUND

A data processing apparatus which generates a frame of image data for display by compositing several layers may be provided with one or more latency buffers. Image data for those plural layers of content can thus be temporarily stored on retrieval from memory in the latency buffer(s) before being composited to generate the final frame for display. The quantity of data which is retrieved from memory (and temporarily stored in such buffers) is generally rather large in a contemporary image processing apparatus, due in particular to the high resolution requirements for contemporary display devices. The latency buffers play an important role in ensuring that image data is already available within the compositing circuitry of the image processing apparatus in advance of being required for the compositing process, such that buffer underrun does not occur and an undesirable interruption to the provision of completed frames is avoided. The opportunity exists to improve the manner in which such latency buffers are used.

SUMMARY

At least one example herein describes an apparatus for processing image data comprising: compositing circuitry to generate a composite layer for a frame for display from image data representing plural layers of content within the frame; and plural latency buffers to store at least a portion of the image data representing the plural layers, wherein at least one of the plural latency buffers is larger than at least one other of the plural latency buffers, and wherein the compositing circuitry is responsive to at least one characteristic of the plural layers of content to allocate the plural layers to respective latency buffers of the plural latency buffers.

At least one example herein describes a method of processing image data comprising: compositing image data representing plural layers of content within a frame to generate a composite layer for the frame for display; storing at least a portion of the image data representing the plural layers in plural latency buffers, wherein at least one of the plural latency buffers is larger than at least one other of the plural latency buffers; and responding to at least one characteristic of the plural layers of content to allocate the plural layers to respective latency buffers of the plural latency buffers.

At least one example herein describes an apparatus for processing image data comprising: means for compositing image data representing plural layers of content within a frame to generate a composite layer for the frame for display; means for storing at least a portion of the image data representing the plural layers in plural latency buffers, wherein at least one of the plural latency buffers is larger than at least one other of the plural latency buffers; and means for responding to at least one characteristic of the plural layers of content to allocate the plural layers to respective latency buffers of the plural latency buffers.

BRIEF DESCRIPTION OF THE DRAWINGS

The present techniques will be described further, by way of example only, with reference to embodiments thereof as illustrated in the accompanying drawings, in which.

DESCRIPTION OF EXAMPLE EMBODIMENTS

Figure 1:
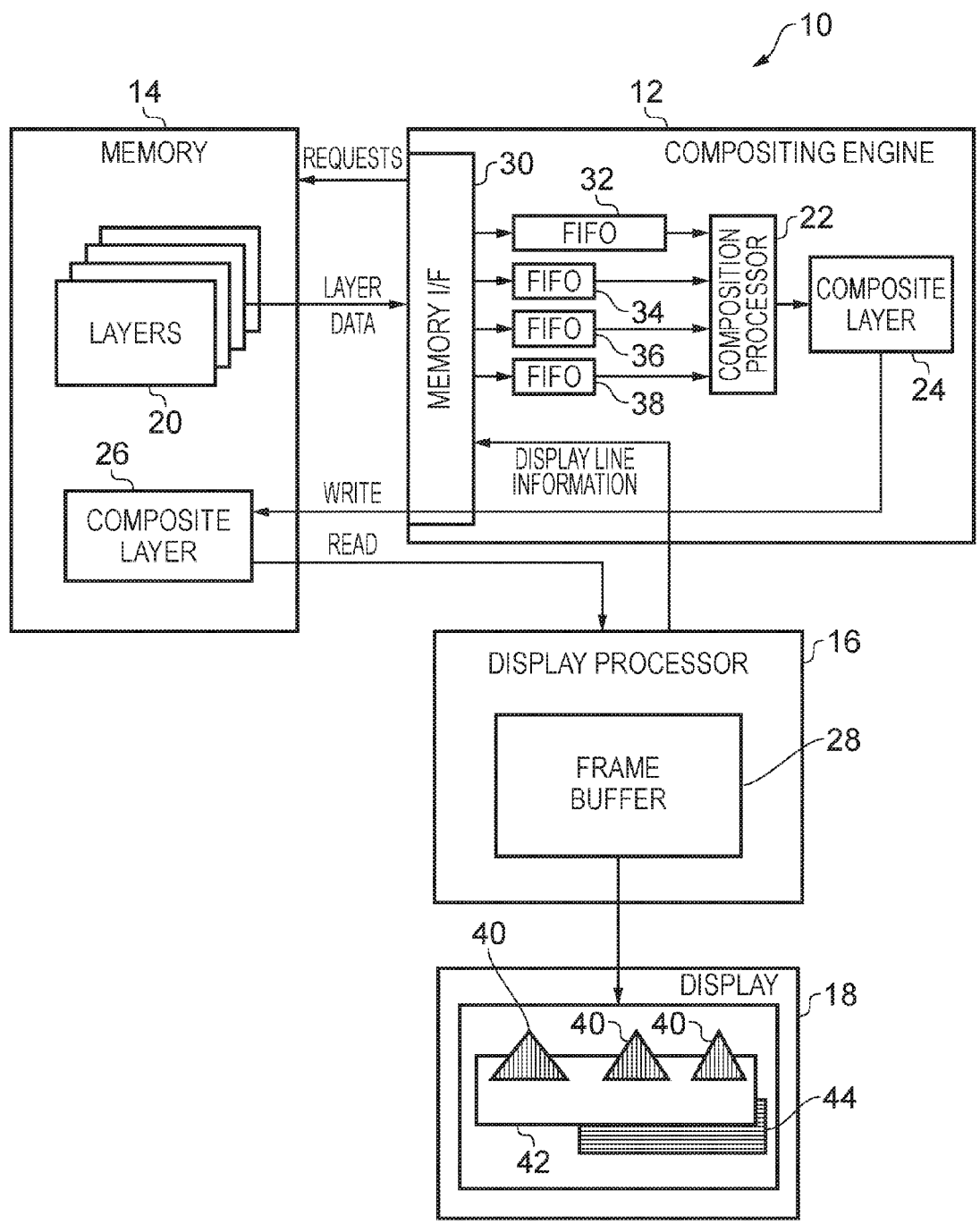
FIG. 1 schematically illustrates an apparatus in one example embodiment showing a compositing engine which retrieves layer image data from memory and temporarily stores this layer image data in a number of latency FIFOs before compositing it into a composite layer for display.

In some example embodiments there is an apparatus for processing image data comprising: compositing circuitry to generate a composite layer for a frame for display from image data representing plural layers of content within the frame; and plural latency buffers to store at least a portion of the image data representing the plural layers, wherein at least one of the plural latency buffers is larger than at least one other of the plural latency buffers, and wherein the compositing circuitry is responsive to at least one characteristic of the plural layers of content to allocate the plural layers to respective latency buffers of the plural latency buffers.

The apparatus for processing image data is provided with multiple latency buffers (to temporarily hold the layer image data before it is composited into a single composite layer for display), wherein notably the multiple latency buffers are not all the same size, but at least one of them is larger than the rest. Providing such "mixed sized" latency buffers to which the plural layers are allocated means that the apparatus is able to buffer a greater quantity of image data for at least one of the layers (allocated to the at least one larger latency buffer) and thus to have the image data associated with that layer available sooner (assuming that the latency buffers are generally kept as full as possible) than the image data for the remainder of the layers. Which of the layers is allocated to which of the respective latency buffers is decided on the basis of an analysis of one or more characteristics of the plural layers of content. The present techniques recognise that there are certain characteristics which may be identified for layers for which it would be advantageous to the compositing process as a whole to have certain information from this layer or these layers available at an earlier stage. In particular, having the image data for one layer which is determined to be significant in this manner available earlier enables processing decisions with respect to other layers in the same composite layer to be made, from which certain processing efficiencies may be gained. Also these techniques mean that such benefits may be obtained without needing similarly to increase the size of all latency buffers and thus area of the apparatus is saved. The manner in which the determination of which layers are allocated to which latency buffers is implemented may take a variety of forms, for example using dedicated circuitry for this purpose or via software, for example in the form of a software driver being executed by a CPU in the wider system.

In some embodiments the compositing circuitry is responsive to the at least one characteristic of a selected layer of the plural layers of content indicating that the selected layer may obscure at least a portion of another layer of the plural layers of content to allocate the selected layer to one of the plural latency buffers which is larger than at least one other of the plural latency buffers. The particular characteristic or characteristics which the compositing circuitry can take into account when determining the allocation of the layers to the latency buffers may take a variety of forms, but it is in particular recognised here that the identification of a characteristic of a layer that indicates that the layer may at least partially obscure another layer (when those layers are composited into single a composite layer for display) represents a particularly useful characteristic to identify, and then to allocate the layer which may obscure at least a portion of another layer to a larger latency buffer. This then allows the compositing circuitry to analyse this layer allocated to the larger latency buffer in advance of the corresponding portion of the possibly obscured layer or layers, and in particular where it is then determined that at least part of another layer will be obscured, steps may be taken to reduce or avoid processing associated with the obscured portion, thus reducing the overall processing which must be carried out by the apparatus and its energy expenditure.

In some embodiments the at least one other of the plural latency buffers has a size proportional to a horizontal line size of a layer, and the at least one of the plural latency buffers which is larger has a size corresponding to a multiple of the horizontal line size of the layer. The relative size of the latency buffers with respect to the layers of image data will determine the proportion of a given layer which may be held in a latency buffer at any one time, and thus the configuration of the latency buffers with respect to the size of the layers is an implementation choice for the system designer dependent on the particular processing requirements of the apparatus. In some embodiments the "normal" latency buffers may be sized to match a horizontal line size of a given layer and the "larger" buffer(s) may be sized as multiple of that horizontal line size. For example, the larger latency buffer(s) may be twice the size of the "normal" buffer(s), i.e. corresponding to two horizontal lines. Thus, in effect this means that the larger latency buffer will hold layer image data a line ahead of the other latency buffers. Such alignment of the relative sizes of the buffers to multiples of the horizontal line size can thus facilitate the respective processing and comparison between two corresponding layers. Other relationships between the latency buffer sizes and horizontal line sizes are also contemplated, both as integer and non-integer multiples, as appropriate to the image data to be processed.

In some embodiments the apparatus further comprises data fetching circuitry to issue memory transactions to retrieve the image data representing the plural layers of content from memory to the plural latency buffers, and the compositing circuitry is responsive to opacity information derived from the image data representing the plural layers of content to cause at least one memory transaction to be eliminated before it is issued. Thus, where the opacity information indicates that at least a portion of one of the layers of content will be obscured by another layer in the foreground (with respect to that layer) and having an opacity such that the background layer will not contribute to the composite layer for display, then the present techniques allow one or more memory transactions associated with the retrieval of image data for that background layer to be eliminated before issuance, due to the fact that image data for the foreground layer held in a larger latency buffer is available in advance, and thus by the elimination of the at least one memory transaction memory traffic within the system can be reduced, thereby reducing memory system power consumption.

In some embodiments the data fetching circuitry is arranged to implement a delay for issuing memory transactions for image data for a smaller latency buffer until the opacity information for a larger latency buffer is available to the compositing circuitry. As mentioned above, the relative size of the smaller and larger latency buffers, and the usual approach of keeping such latency buffers as full as possible will generally in itself result in the image data held in the larger latency buffer comprising pixel data which is in advance of (in terms of sequential pixel processing) the image data held in the smaller latency buffer. With a suitable selection of relative sizes of the smaller and larger latency buffers, and under smooth operation of the memory system, this can result in the opacity information for a layer held in the larger latency buffer at a given pixel position being available before a memory transaction for the corresponding pixel position for image data for a layer being held in the smaller latency buffer is required to be issued. However, to ensure that this is the case in such embodiments the data fetching circuitry may be arranged to explicitly delay the issuance of one or more memory transaction(s) for data directed to a smaller latency buffer, thus potentially allowing the memory transaction(s) to be eliminated if it is determined that the opacity information shows that obscuration of a background layer means that the image data for that layer need not even be retrieved from memory.

In some embodiments the data fetching circuitry is arranged to implement the delay when the smaller latency buffer and the larger latency buffer cover a same region of the frame. Whilst a delay for issuing memory transactions for image data for the smaller latency buffer may be generally applied, the implementation of such a delay only when the smaller and larger latency buffers cover a same region of the frame supports the above-described process of determining when at least a portion of one layer will entirely obscure at least a portion of another layer (i.e. the "same region" comprises the overlap region between the two layers).

In some embodiments the data fetching circuitry is responsive to retrieval of the image data for a larger latency buffer taking at least a predetermined time to abort the delay and to issue the memory transactions for the image data for the smaller latency buffer. Such embodiments are provided in recognition of the fact that although, for the reasons discussed above, it is advantageous for the retrieval of image data for the smaller latency buffer to be "delayed" with respect to the retrieval of the image data for the larger latency buffer, there comes a point where further delay of the issuance of a memory transaction for the image data for the smaller latency buffer could risk a buffer underrun, due to the fact that the required image data for the smaller latency buffer (as part of its contribution to the composite layer) not being available. Hence a predetermined time limit may be set after which the memory transaction will be issued for the image data for the smaller latency buffer, regardless of what other comparisons (for example with respect of opacity information in another layer) might still be ongoing.

In some embodiments the data fetching circuitry is responsive to an indication that the opacity information is not available for the image data for the larger latency buffer to abort the delay and to issue the memory transactions for the image data for the smaller latency buffer. Thus, where it is identified that the opacity information for the image data for the larger latency buffer is not available, for example either because this information is missing from the image data retrieved or its generation from the image data received is identified as being likely to take a longer time than is practical for the purposes of the compositing, the delay may be aborted and the memory transaction(s) for the smaller latency buffer image data issued forthwith. This also supports a configuration in which buffer underrun is avoided.

In some embodiments the data fetching circuitry is responsive to an indication that the memory is currently handling more than a threshold number of memory transactions to abort the delay and to issue the memory transactions for the image data for the smaller latency buffer. Thus another situation in which the apparatus may identify that holding back a memory transaction for image data for a smaller latency buffer may be undesirable is in the context of a heavily loaded memory system (e.g. if a large number of outstanding transactions are pending or a large transaction latency has developed) and to seek to avoid buffer underrun, further delay of a smaller latency buffer targeted memory transaction is avoided.

In some embodiments the apparatus comprises data fetching circuitry responsive to current display line information for the frame being displayed to issue memory transactions to retrieve the image data from the memory to the plural latency buffers for display lines in advance of the display of those display lines by an advance amount which depends on a respective size of the latency buffer to which it will be stored. This allows the fetching of image data from the memory for the latency buffers to be coordinated with the ongoing display of a frame. In particular the provision of current display line information (i.e. indicating which horizontal line, and potentially even pixel position, is currently being displayed) to the data fetching circuitry enables the data fetching circuitry to seek to ensure that corresponding memory transactions are issued sufficiently in advance of the current display activity. For example it can be provided that the image data in the respective latency buffers will be retrieved by an advance amount corresponding to the respective size of the latency buffer, e.g. such that a display line ahead of the current display position will generally always be available in the corresponding latency buffer.

In some embodiments the at least one characteristic comprises, for at least one layer of the plural layers, at least one of:
  per-pixel opacity information;
  an image format;
  an image compression support;
  an image compression format;
  a data size;
  an indicated priority;
  a number of pixels covered;
  a proportion of the frame covered;
  a geometric processing indicator;
  a layer ordering;
  an extent of layer overlap; and
  an indicated content type.

Accordingly, the at least one characteristic may take a variety of forms, where the present techniques recognise that there are a range of different characteristics of at least one layer of the plural layers on which it may be advantageous to base the decision of which layers of content to allocate to which respective latency buffers, in the context of at least one of those latency buffers being larger than the rest. As discussed above, the present techniques recognise that the opacity of a foreground layer represents a useful characteristic to identify and to allocate such layers to the larger latency buffer(s), such that a early identification may be made of whether a portion of a background layer is entirely obscured. Hence, for this purpose characteristics such as per-pixel opacity information (e.g. per-pixel alpha blending or chroma-key information, or per-pixel cookie-cut information) may be identified, an indicated priority, and/or or layer ordering which is used to identify foreground through to background layers. Other example characteristics which may be beneficial to take into account are indications of the degree of overlap between the layers, for example as may be indicated by a number of pixels covered by a given layer (where there may be a de minimis cut-off below which it is determined that processing expenditure in determining whether a particularly small area is obscured or not is not worthwhile), as well as a proportion of the frame covered or an extent of layer overlap.

Yet further indications which may be beneficial to take into account comprise the image format, the compression support and/or the compression format. These latter characteristics may (merely from, say, the indicated format) for example indicate whether opacity information will be obtainable within the required timescales and thus a decision can then already be made on the basis of these characteristics as to whether or not to allocate the layers in a particular way to the latency buffers. Each layer may be in a different format. A further characteristic which may be factored in is a geometric processing indicator, for example indicating that a given layer will be subject to a rotation, scaling, a flipping, etc. Such a geometric processing indicator may add sufficient complexity to the determination of, say, the overlap between the layers that it is not considered practicable (within the processing timescales available) to try to determine whether that overlap meets a defined threshold. The data size (of the respective layer data) may also be considered in a similar manner, for example where layer data has a very large data size it may be decided that insufficient time will be available for the application of the present techniques. In consequence a particular allocation of selected layers to latency buffers in the presence of such a geometric processing requirement or large sized image layer may then be dispensed with, and the layer to buffer allocation is then carried out in a default manner.

In some embodiments the apparatus further comprises meta-data storage to store meta-data derived from the image data representing the plural layers of content, wherein the meta-data comprises the opacity information. Accordingly, the opacity information may be comprised within meta-data derived from the image data and dedicated storage may be provided within the apparatus for holding this meta-data such that it is readily analysed. Whilst in some embodiments the meta-data storage may hold additional information as well as the opacity information, in other embodiments the dedicated storage only holds opacity information.

In some embodiments the meta-data is not generated for regions of the frame where the plural layers do not overlap. In other words, in such embodiments the meta-data is only generated for regions of overlap between the plural layers, thus saving processing where the lack of overlap between layers means that no obscuration of one layer by another can occur.

In some embodiments the compositing circuitry is responsive to arrival of the image data representing the plural layers of content to generate meta-data from the image data representing the plural layers of content, wherein the meta-data comprises the opacity information. Thus, whilst the meta-data may already be available in the image data retrieved, in such embodiments the meta-data is generated from the image data after retrieval as a result of an issued memory transaction.

In some embodiments the plural latency buffers comprise pixel annotation circuitry to hold indications of pixels for which no image data was retrieved because a corresponding memory transaction was eliminated, and the apparatus further comprises display processing pipeline circuitry to process the image data for display, wherein the display processing pipeline circuitry comprises further pixel annotation circuitry to propagate the indications through the display processing pipeline circuitry as the image data is processed. Accordingly, where a memory transaction is eliminated, and as a consequence the image data for a particular layer which would have been retrieved as a result of that memory transaction is then not available to the composition processor (here in the form of the display processing pipeline), the pixel annotation circuitry is provided to indicate which pixels are "missing" in this manner, such that the display processing pipeline circuitry can then continue with its processing, taking into account that those pixels are missing, and indeed saving valuable processing and energy expenditure by not subjecting those pixels to further processing.

The pixel annotation circuitry and further pixel annotation circuitry may take a variety of forms, but in some embodiments the pixel annotation circuitry and further pixel annotation circuitry comprise a sequence of flip-flops. The indication (for example per-pixel) of the absence of that pixel data may thus be readily represented as a single bit, which may therefore be propagated in an efficient manner, requiring little additional circuitry to known display frame circuitry, through a sequence of flip-flops.

In some embodiments the display processing pipeline circuitry is responsive to the indications of pixels for which no image data was retrieved held by the pixel annotation circuitry to propagate null pixels through the display processing pipeline circuitry for the pixels for which no image data was retrieved. Accordingly, where the image data for one or more pixels is missing in this manner, that pixel or those pixels may be represented by a "null pixel" of a predefined format, such that any subsequent processing stages can identify this or these missing pixels from the presence of the predefined format of null pixel.

In some embodiments the display processing pipeline circuitry is responsive to the indications of pixels for which no image data was retrieved held by the pixel annotation circuitry to propagate an indication of a number of missing pixels through the display processing pipeline circuitry for the pixels for which no image data was retrieved. Accordingly, where a group of pixels (for example forming a horizontal line of a region of overlap in an obscured layer) are "missing" in this manner, the pixel annotation circuitry may have a configuration which enables it to propagate an indication of how many pixels are missing and thus instead of individual indications per-pixel being propagated efficiencies may be derived from propagating a more compact indication of a larger number as a group.

In some embodiments the compositing circuitry is responsive to at least one geometric processing indicator derived from the image data representing the plural layers of content indicating that at least one of the plurality of layers will be subjected to geometric processing to suppress elimination of memory transactions for the plurality of layers. The geometric processing indicator may for example indicate that a layer will be subject to, say, a rotation, a scaling, a flipping, etc. and this may then add sufficient complexity to the necessary determination of how the resulting geometrically processed layer would overlap with other layers in the composited layer that within the timescales for processing available the above-discussed techniques of determining overlap and relative opacity would prove too costly (in terms of time, energy expenditure, logic area and/or complexity) and thus elimination of memory transactions for this set of layers, when such a geometric processing indicator is found, may be dispensed with to provide a greater overall processing efficiency.

In some embodiments the apparatus comprises a reorder buffer to reorder the image data representing the plural layers of content from the memory when the image data is returned from the memory in a different order to that in which it was requested. The provision of such a reorder buffer thus enables the memory system to freely provide the image data in response to issued memory transactions as it becomes available, whilst further enabling the apparatus to reconstruct the correct ordering of the image data to facilitate further processing of the image data within the apparatus.

In some embodiments the apparatus comprises one random access memory in which more than one of the plural latency buffers are implemented. In other words, a single random access memory (RAM) may be segmented into more than one portion, wherein each segment corresponds to at least one latency buffer.

In some embodiments the apparatus comprises plural random access memories in which the plural latency buffers are implemented. Thus, alternatively or in addition, the apparatus may have more than one random access memory (RAM) for the provision of the latency buffers and, for example, one latency buffer may implemented in each RAM.

In some embodiments the apparatus comprises plural random access memories in which one of the plural latency buffers is implemented. Thus, alternatively or in addition, one latency buffer may be implemented across more than one random access memory (RAM).

In some example embodiments there is a method of processing image data comprising: compositing image data representing plural layers of content within a frame to generate a composite layer for the frame for display; storing at least a portion of the image data representing the plural layers in plural latency buffers, wherein at least one of the plural latency buffers is larger than at least one other of the plural latency buffers; and responding to at least one characteristic of the plural layers of content to allocate the plural layers to respective latency buffers of the plural latency buffers.

In some example embodiments there is an apparatus for processing image data comprising: means for compositing image data representing plural layers of content within a frame to generate a composite layer for the frame for display; means for storing at least a portion of the image data representing the plural layers in plural latency buffers, wherein at least one of the plural latency buffers is larger than at least one other of the plural latency buffers; and means for responding to at least one characteristic of the plural layers of content to allocate the plural layers to respective latency buffers of the plural latency buffers.

Some particular embodiments will now be described with reference to the figures.

FIG. 1 schematically illustrates an apparatus 10 in one example embodiment. The apparatus 10 itself is essentially composed of the compositing engine 12, but in the embodiment illustrated a memory 14, a display processor 16 and a display unit 18 are also illustrated. One of ordinary skill in the art will recognise that the apparatus may have various further known components and that these have been omitted here merely for the sake of clarity of illustration and discussion of the present techniques. Also, although the compositing engine 12 and display processor 16 are illustrated as separate components in the embodiment of FIG. 1, in a modification the compositing engine and display processor are combined to form a combined compositing display processor. The central function of the compositing engine 12 is to retrieve layers of image data 20 from the memory 14 and by means of its composition processor 22 to generate a single composite layer 24 which is then written back out to the memory as a stored composite layer 26. This is then read by the display processor 16 in order to generate a full frame buffer 28 to be displayed by the display unit 18. Note that in the case of the above-mentioned combined compositing display processor the composited frame (composite layer) can be transferred straight to a display controller without writing it to or reading it from memory. The compositing engine 12 has a memory interface 30 via which memory transactions are issued (as requests) to the memory 14 for the layers 20 to be retrieved and this image data, received by the memory interface 30 is then temporarily buffered in a set of latency buffers 32, 34, 36, and 38 before being retrieved by the composition processor 22 in order to generate the composite layer 24.

The latency buffers 32-38 are each configured as a FIFO device and in particular it should be noted that whilst the latency buffers 34, 36 and 38 are the same size, the latency buffer 32 is larger than the others and indeed in this embodiment has a size which is double that of the other latency buffers. In use, the apparatus will seek to keep the latency buffers 32-38 full, and therefore in the example of FIG. 1 there will typically be twice as much data buffered in the "extended latency" buffer 32 as in the "normal latency" buffers 34-38. A further feature of the use of the four latency buffers shown is that, for example at the start of a new frame, the compositing engine 12 allocates the image data layers 20 to the respective latency buffers 32-38 on the basis of one or more predetermined characteristics of those layers. In the example embodiment illustrated in FIG. 1 it seeks to identify a particular layer amongst the layers 20 which has per-pixel opacity definitions (e.g. alpha blending, chroma-key or cookie cut) and which overlays other layers. It then allocates this identified layer to the larger (extended latency) buffer 32. Additional checks may also be performed, as will be discussed in more detail below with reference to the following figures, for example that the overlap of this layer with the other layer(s) meets a predefined threshold overlap. The allocation of this identified "foreground" layer with per-pixel opacity definition (e.g. alpha-blending, chroma-key or cookie cut) to the extended latency FIFO 32 means that (because of the fact that the latency buffers 32-38 will generally be kept as full as possible), the image data for the identified foreground layer with the per-pixel opacity information will effectively be fetched in advance of the image data for the other layers. Indeed, in the example of FIG. 1, the size of the latency buffers 34-38 corresponds to a horizontal line width of one of the layers, and therefore in view of the fact that the extended latency FIFO buffer 32 is twice the size of the other buffers, the image data for the layer allocated to this latency buffer will effectively be fetched a line ahead of the other layers. As will be discussed in more detail with reference to the figures which follow, this enables the compositing engine 12 in some circumstances to identify that particular pixels or regions of pixels from the other layers (i.e. those allocated to the normal latency buffers 34-38) will be completely obscured by an overlapping, fully opaque set of pixels or region of pixels of the foreground layer which is allocated to the extended latency FIFO 32, and where possible the compositing engine 12 will suppress (eliminate) memory transactions for the corresponding image data, such that memory traffic for image data which will in any regard not contribute to the composite layer and the final display frame can be avoided. Memory system and display processor power expenditure are therefore reduced.

FIG. 1 also illustrates the display processor 16 providing the memory interface 30 of the compositing engine 12 with display line information, which indicates to the memory interface which display line of the final frame for display is currently being transferred from the frame buffer 28 to the display unit 18 and the memory interface 30 can make use of this information to ensure that memory transactions requesting image data from the layers 20 in memory 14 are issued sufficiently in advance that buffer underrun does not occur. The example frame of image data shown being displayed by the display unit 18 in FIG. 1 illustrates the principle of overlapping layers, wherein the triangles 40 represent the furthest forward foreground layer, the rectangle 42 represents a layer behind this, and the rectangle 44 represents a layer in the background. Due to the overlap between the respective shapes of these layers, it will be appreciated from the example shown that a non-trivial portion of the rectangle 42 is obscured by the triangles 40, and equivalently a significant portion of the rectangle 44 is obscured by the rectangle 42. Note that in this example (for simplicity of discussion) the layers are fully opaque, such that any overlap results in a further forward layer fully obscuring a layer behind it if those two layers overlap.

Figure 2:
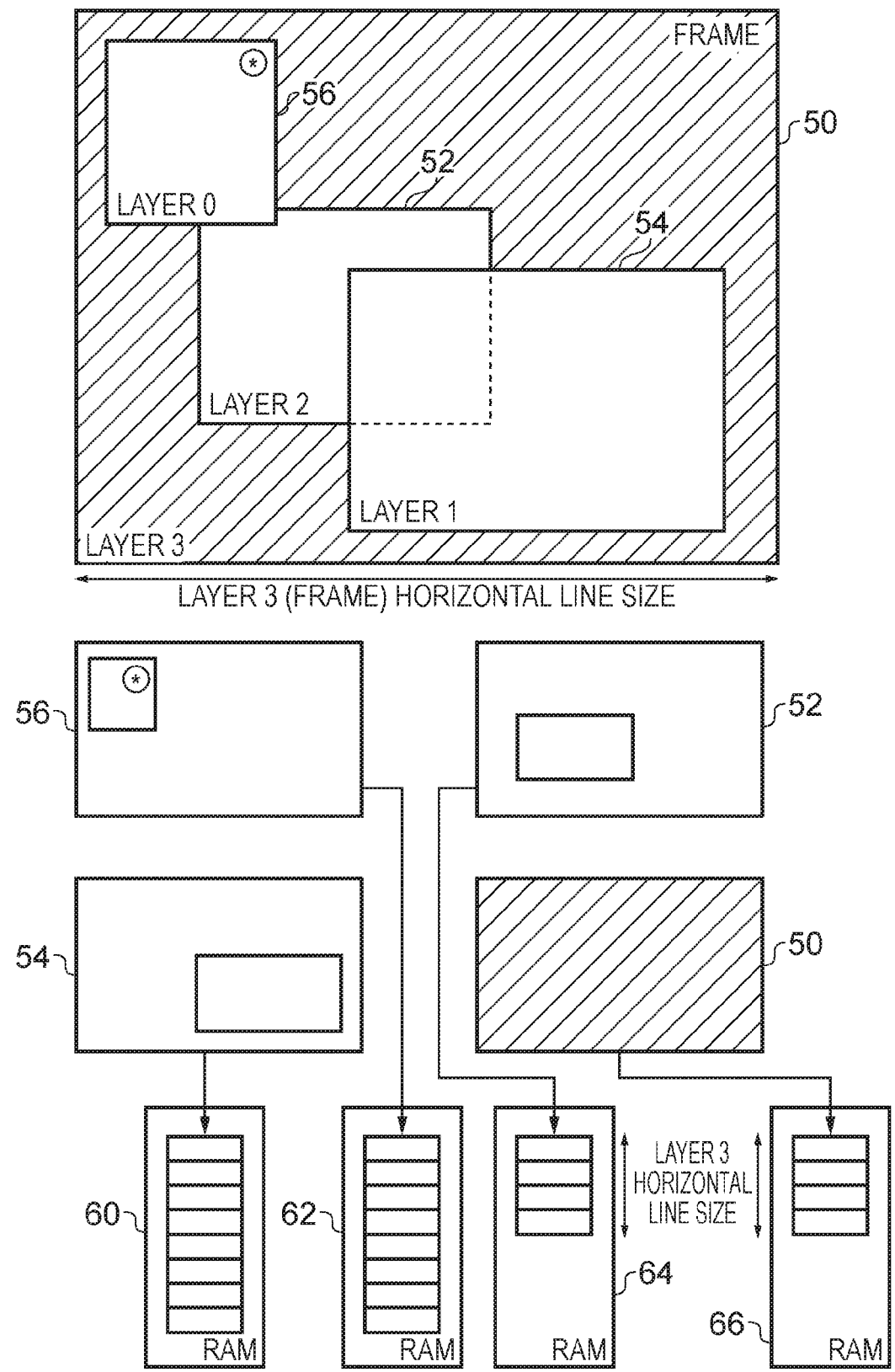
FIG. 2 schematically illustrates a frame of image data formed of four layers and one manner in which these layers are allocated to four "mixed size" latency buffers in one example embodiment.

FIG. 2 provides a more detailed illustration of an example display frame comprising image data generated from four separate layers. Layer 3 is a background layer which corresponds in size to the frame 50, whilst layers 0-2 are overlaid on top of this background layer, and amongst themselves have an ordering which places layer 2 behind layers 0 and 1. Although layers 0 and 1 do not overlap, in fact layer 0 is the foreground-most layer in the ordering of the set of four layers. The asterisk in the corner of this layer indicates this and may also represent an indicator that layer 0 is the "highest priority" layer. Indeed, in some embodiments particular layers may be provided with a priority indicator, showing that (irrespective of their strict position in a layer ordering) such a layer should be treated as high priority and therefore may also on this basis be allocated to the extended latency buffer, such that the compositing engine or processor will have the opportunity to examine the content of the image for this layer in advance of the other layers. Otherwise "priority" here may be considered synonymous with the ordering of the layers. The prioritisation of one or more layers may also result from the known type of content of the layer(s), i.e. where a layer is known (or indicated) to comprise image data for a type of content which is of particular importance to the final display then the layer can be prioritised and, where possible, allocated to an extended latency buffer. The allocation of the layers to the latency buffers in the example of FIG. 2 is shown in the lower part of the figure, wherein layers 0-3, here labelled 56, 54, 52 and 50 respectively are shown, with the image data 56 and 54 (from layers 0 and 1) allocated to the extended latency buffers 60 and 62, whilst the image data 52 and 50 (from the layers 2 and 3) are allocated to the normal latency buffers 64 and 66. Note also that in this example four distinct RAMs are provided, in which each of the extended latency buffers and the normal latency buffers are respectively instantiated. Note also that as shown in the schematic representation of the buffers in RAM 64 and 66, the size of the buffer corresponds to the layer 3 horizontal line size, i.e. the frame horizontal line size, whilst the extended latency buffers are double this size. As a result, the image data for the layers 0 and 1 (56 and 54) allocated to the extended latency buffers 60 and 62 will be available a line ahead of the layers 2 and 3 (52 and 50) which are allocated to the normal latency buffers 64 and 66.

Figure 3:
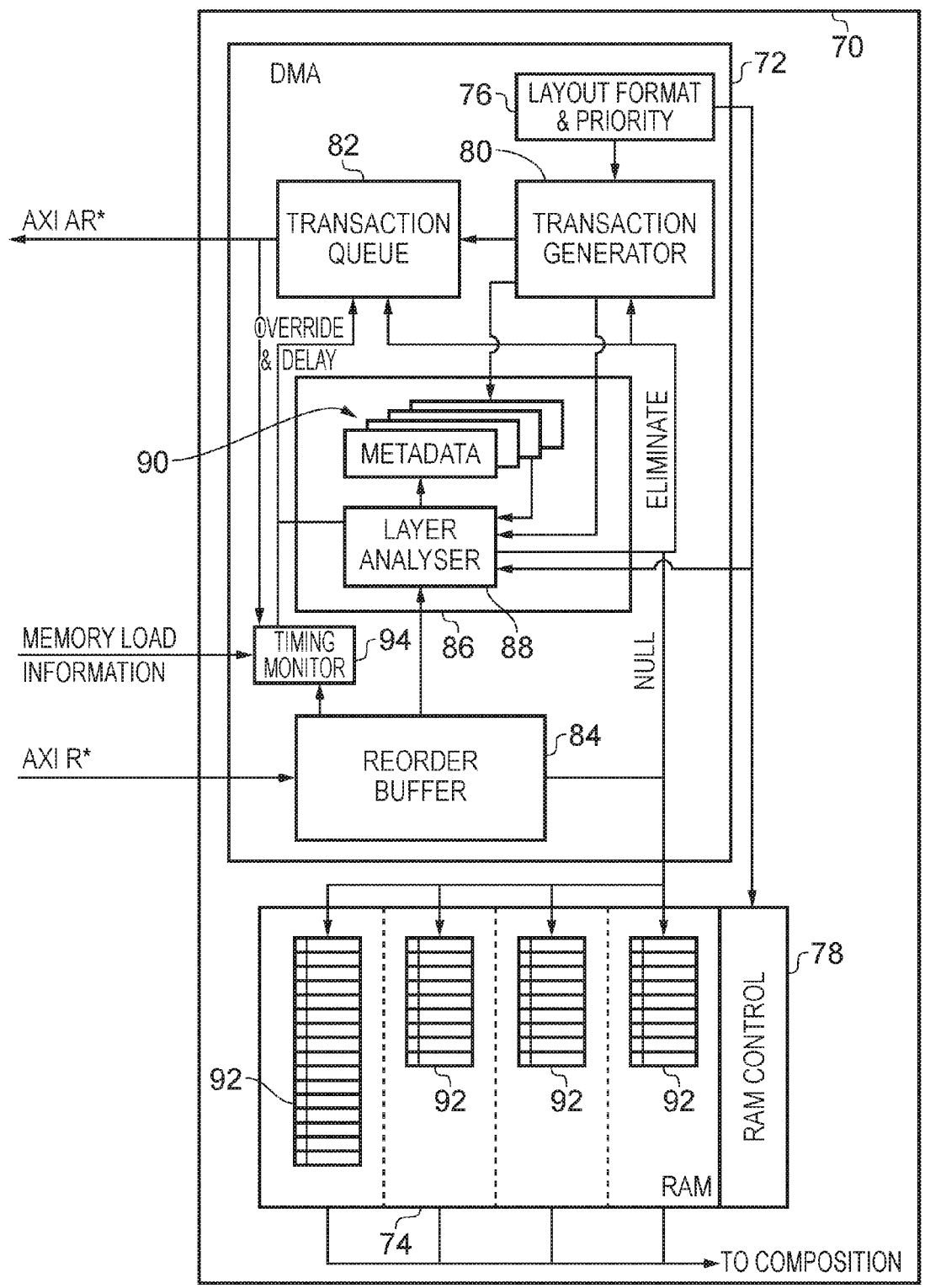
FIG. 3 schematically illustrates an apparatus in one example embodiment comprising a DMA and a RAM.

FIG. 3 schematically illustrates in more detail the configuration of a composition engine 70 in one example embodiment. The two main components of the composition engine 70 are the DMA controller 72 and the random access memory (RAM 74). As in the case of FIG. 1, one of ordinary skill in the art will recognise that the apparatus may have various further known components and that these have been omitted here merely for the sake of clarity of illustration and discussion of the present techniques. For a new frame (or set of frames) the DMA 72 is programmed with the layout format and some priority information 76, defining the number of layers which must be composited to form the new frame, information about their memory location, their size, and so on. This information is used to determine the initial allocation of layers to the latency buffers and is signalled to the RAM control 78 which maintains overall control of the RAM 74. The determination of which layers are allocated to which latency buffers is thus performed by component 76, which in the example of FIG. 3 comprises dedicated circuitry for this purpose, although in other variants this determination is performed by software running within the DMA 72. In yet other embodiments, this determination is performed by a software driver being executed by a CPU in the wider system. When a software-based approach is taken, the outcome of this determination is programmed into the compositing display processor or composition engine to configure its further operation. Note that in this example only a single RAM is provided, within which four separate latency buffers, one of extended size and the other three of equal smaller size, are instantiated. The layer definitions taken from the layout format 76 are also passed to the transaction generator 80, which begins generating corresponding memory transactions in order to retrieve the required image data for the respective layers from memory.

These memory transactions are queued in the transaction queue 82 before being passed to memory via the interconnect which connects the DMA 72 to the memory. In the example of FIG. 3 this is an interconnect defined accordingly to the ARM AMBA standard. Image data returned from the memory to the DMA 72 is first written into the re-order buffer 84, which enables the image data to be re-ordered into the appropriate logical order according to the composite layer to be generated, even when the image data itself is not returned in that order. From the reorder buffer 84, the image data is then written into the appropriate latency buffer, the destination latency buffer for a given item of image data being determined by the layer to which that image data belongs and the original allocation of layers to latency buffers. Within the DMA 72 an analysis unit 86 is provided which itself comprises a layer analyser 88 and a set of meta-data buffers 90. The layer analyser 88 accesses the reorder buffer 84 in order to either extract the meta-data if it is already present, or to generate it by analysis of the image data, and the meta-data for the respective layers is then stored in the meta-data buffers 90. This meta-data may comprise various associated information related to the layers of image data, but in particular comprises opacity information and in fact in this example embodiment only comprises the opacity information. This may for example be in the form of per-pixel alpha blending, chroma key or a cookie cutter definitions. Thus, on the basis of an ongoing analysis of the meta-data stored in the meta-data buffers 90, the layer analyser 88 can determine if there are portions of background layers that will not be visible. In this event the layer analyser 88 signals to the transaction generator 80 and the transaction queue 82 an elimination signal associated with these hidden portions and any queued memory transactions corresponding to these sections of image data are then eliminated from the transaction queue 82. Indeed when generating memory transactions for lower priority (further backward layers) overlapped layers the transaction generator 80 can also interrogate the meta-data buffers 90 and if the region is marked as opaque for a higher priority/further forward layer which has already been retrieved then the memory transactions for an obscured region of a lower priority layer are omitted. In addition, when a memory transaction is eliminated in this manner, the layer analyser 88 also signals to the latency buffers that the corresponding pixel data is "null", i.e. that no corresponding "real" image data corresponding to these pixel positions can be expected to be provided by the memory. For the purpose of handling such "null" pixels, each of the latency buffers in the RAM 74 is provided with a sequence of flip-flops 92 corresponding to the size of the respective latency buffer. Thus, each entry in each of the latency buffers can be labelled with a single bit which propagates through the FIFO structure of the latency buffer, indicating where appropriate that definition data for a given pixel is absent. Such a sideband bit indicating a null pixel may also be propagated further through the display processing pipeline leading to the display unit as is discussed below with reference to FIG. 5.

Additionally, the DMA controller 72 is also provided with timing monitor circuitry 94. This timing monitor 94 monitors the issuance of memory transaction requests from the transaction queue 82 and in particular monitors the time taken for a memory request relating to image data destined for the extended latency buffer. In the event that a given memory transaction takes longer than a predetermined time to complete, the timing monitor 94 sends an override signal to the transaction queue 82. This signal causes the release of any other "related" memory transactions queued therein that have been delayed pending the return of data from that memory transaction and destined for the extended latency buffer. This provides greater likelihood that a buffer underrun of the normal latency buffer(s) do(es) not occur by not allowing these delayed memory transactions to wait too long for possible elimination. The timing monitor 94 also receives other information from the memory system and where an indication relating to the current memory loading indicates that the memory system is currently heavily loaded (e.g. if a large number of outstanding transactions are pending or if a large transaction latency is developing), then the timing monitor 94 can also respond to this situation by issuing the override signal for one or more transactions held in the transaction queue to release these low priority transactions to seek to ensure that a buffer underrun does not occur.

Figure 4:
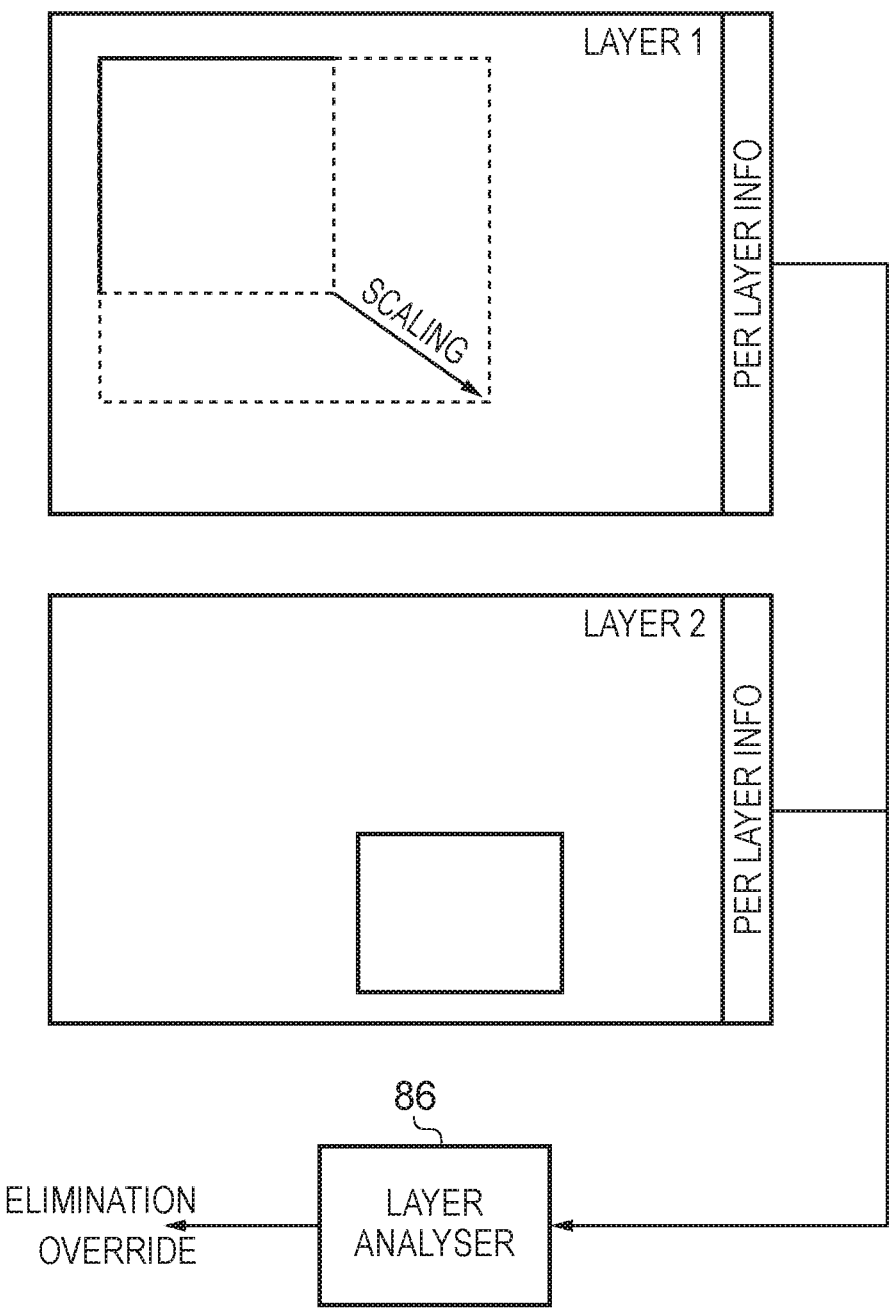
FIG. 4 schematically illustrates overriding the elimination of memory transactions in one example embodiment when one layer is defined to include a geometric processing indicator, in this example the geometric processing being a scaling.

FIG. 4 schematically illustrates a first and second layer (layer 1 and layer 2) in which the per-layer information for layer 1 indicates that the layer will additionally be subject to a scaling operation. In other words, layer 1 as defined will be scaled (enlarged in this example) as part of the composition process. The per-layer information is received by the layer analyser 86 (see FIG. 3) and in this embodiment, the layer analyser 86 has a configuration such that if at least one of the layers to be composited is indicated to be subject to a geometric processing (such as the indicated scaling), then the layer analyser responds by issuing the elimination override signal. This is due to the fact that in order to provide a fast and efficient processor, occupying low area and having low complexity, the ability to determine the overlap and potential hiding of background layer portions behind foreground layer portions would have an additional complexity by factoring in the geometric processing (i.e. the scaling in the example of FIG. 4) and thus the delayed normal latency memory transactions are submitted without waiting for the extended latency image data to be ready.

Figure 5:
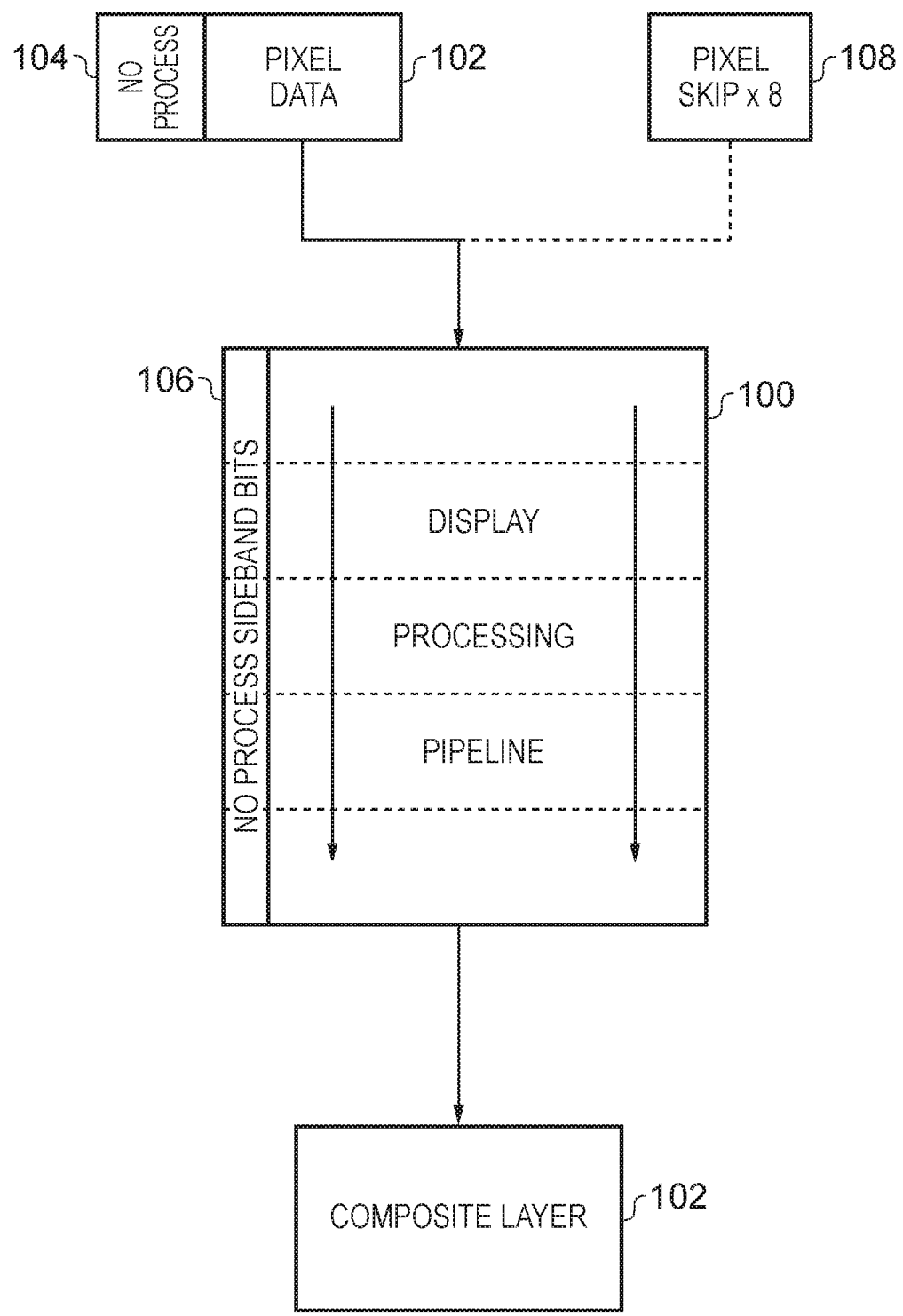
FIG. 5 schematically illustrates a display processing pipeline in one example embodiment and the progress of pixel data through that display processing pipeline accompanied by indications that certain items of pixel data will not contribute to the displayed frame.

FIG. 5 schematically illustrates the propagation of "null pixel" data through display processing pipeline circuitry, wherein the sideband bits 92 shown for the latency buffers 92 in FIG. 3 are propagated through the display processing pipeline 100. The annotation of pixel data 102 with such sideband bits indicating "no process" 104 is shown in the upper part of FIG. 5 entering the display processing pipeline and in the display processing pipeline where a sequence of flip-flops 106 efficiently enables a single marker bit to indicate whether a given pixel should be processed or not. An alternative embodiment is also shown in FIG. 5 by the pixel skip block 108, which in the example of FIG. 5 shows that a block of 8 pixels (e.g. 8 sequential pixels in a horizontal line) should be skipped. In other words, when this indication enters the display processing pipeline the processing stages of the pipeline 100 can then miss out processing for these 8 pixels at each stage as the image data is processed and from which the composite layer 102 is generated.

Figure 6:
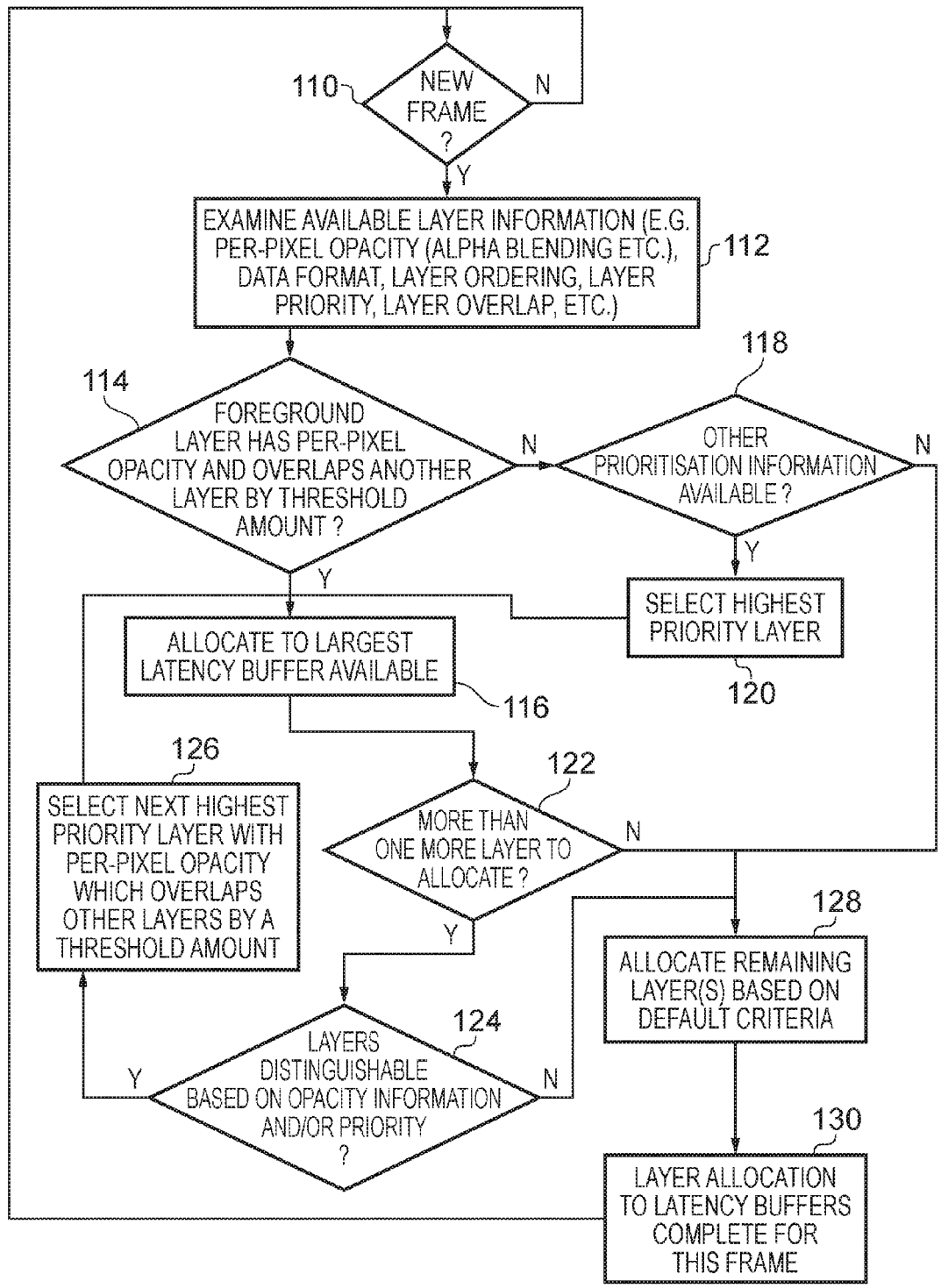
FIG. 6 shows a sequence of steps which are taken in one example embodiment when allocating layers to available latency buffers.

FIG. 6 shows a sequence of steps which are taken in one embodiment when allocating layers to latency buffers for a new frame of image data. The flow can be considered to begin at step 110 from which, once a new frame is to be started, at step 112 the available per-layer information is examined to determine if there is a characteristic of one or more of the layers which makes it suitable for allocation to the extended latency buffer or buffers available in the system. For example, per-pixel opacity (e.g. alpha blending), a layer ordering or priority, and so on may be taken into account, as well as the data format/encoding (e.g. YUV, ARGB 32-bpp, etc.), and/or an indication by comparison of two or more layers that a layer overlap (of above a threshold) exists. Each layer may have a different image format. On this basis it is then determined at step 114 if a foreground layer has been identified which has per-pixel opacity information and with significant overlap with another layer (i.e. by above a defined threshold amount). If this is the case then the flow proceeds to step 116 where this identified foreground layer is allocated to the largest latency buffer available, i.e. in the first instance to the extended latency buffer. If however at step 114 such a foreground layer (with per-pixel opacity and overlap) is not found then the flow proceeds to step 118 where it is determined if there is other prioritisation information available for the layers. If there is then at step 120 the highest priority layer is selected and at step 116 this is allocated to the largest latency buffer available. Following step 116, at step 122 it is then determined if there is more than one more layer to allocate to the latency buffers. If this is the case then at step 124 it is determined if the layers are distinguishable based on opacity information and/or their respective priorities (if defined). If they are then the flow proceeds to step 126 where the next highest priority layer with per-pixel opacity and which overlaps with other layers by a threshold amount is then selected and at step 116 this is then allocated to the largest latency buffer still available. From any of steps 118, 122, or 124 a negative answer causes the flow to proceed to step 128 where any remaining layers are allocated to the latency buffers based on default criteria, for example based on a nominal ordering of the layers. It should be noted that in fact in all cases a selected layer will already have been allocated to an extended latency buffer at this stage and therefore, if all extended latency buffers have already had layers allocated to them, at step 128 the remaining layers can be allocated to a set of remaining, equally sized normal latency buffers and the choice of which layer is allocated to which specific buffer is of little significance. Following step 128 the layer allocation to the latency buffers is then complete (at step 130) and the flow returns to step 110 to wait for a new frame. It should be noted that it is not necessary for a new allocation of layers to latency buffers to be performed for each new frame and there may be instances where it is known that the layer definitions will not change for a sequence of frames and in such a situation the allocation process shown in FIG. 6 need then only take place when a change of layer definition within the frame takes place.

Figure 7:
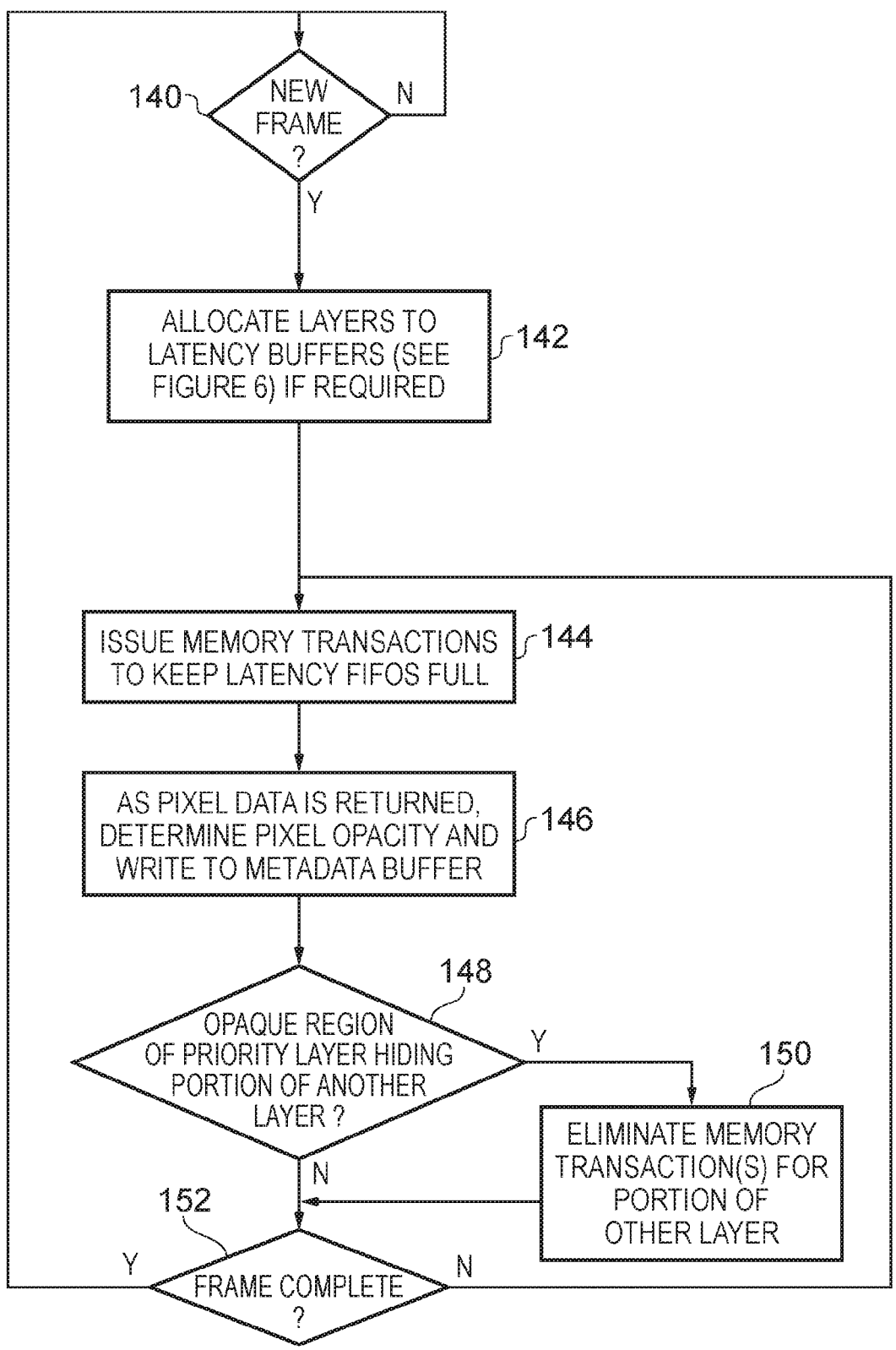
FIG. 7 shows a sequence of steps which are taken in one example embodiment for each frame to firstly allocate the layers to the latency buffers and then to eliminate some memory transactions on the basis of pixel opacity information.

FIG. 7 shows a sequence of steps which are taken in one embodiment which begins with a similar set of steps to those shown in FIG. 6, namely waiting for a new frame at step 140 and then the set of steps shown in FIG. 6 for the allocation of layers to latency buffers are carried out at step 142, although as indicated at step 142 this is only performed if required, for the reasons given above with respect to the layer definitions not changing between some frames. However thereafter the process for retrieving image data for the layers from memory to the latency buffers begins at step 144 where the system issues memory transactions seeking to keep the latency buffers (FIFOs) as full as possible. Step 146 shows that as the pixel data is returned for the layers from memory the pixel opacity is (if possible) determined and it written into the corresponding meta-data buffer for that layer (see FIG. 3). If at step 148 it is determined that there is an opaque region of a priority layer (i.e. a foreground layer) which is fully hiding a portion of another layer, then the flow proceeds via step 150 where one or more memory transactions for that portion of the other layer are eliminated. At step 152 it is determined if the frame has now been completed, i.e. if all pixel data for the layers of this frame that need to be retrieved from memory have now been retrieved.

Whilst this is not the case the flow loops back to step 144 and further memory transactions are issued. Once the frame is complete then the flow returns to step 140.

Figure 8:
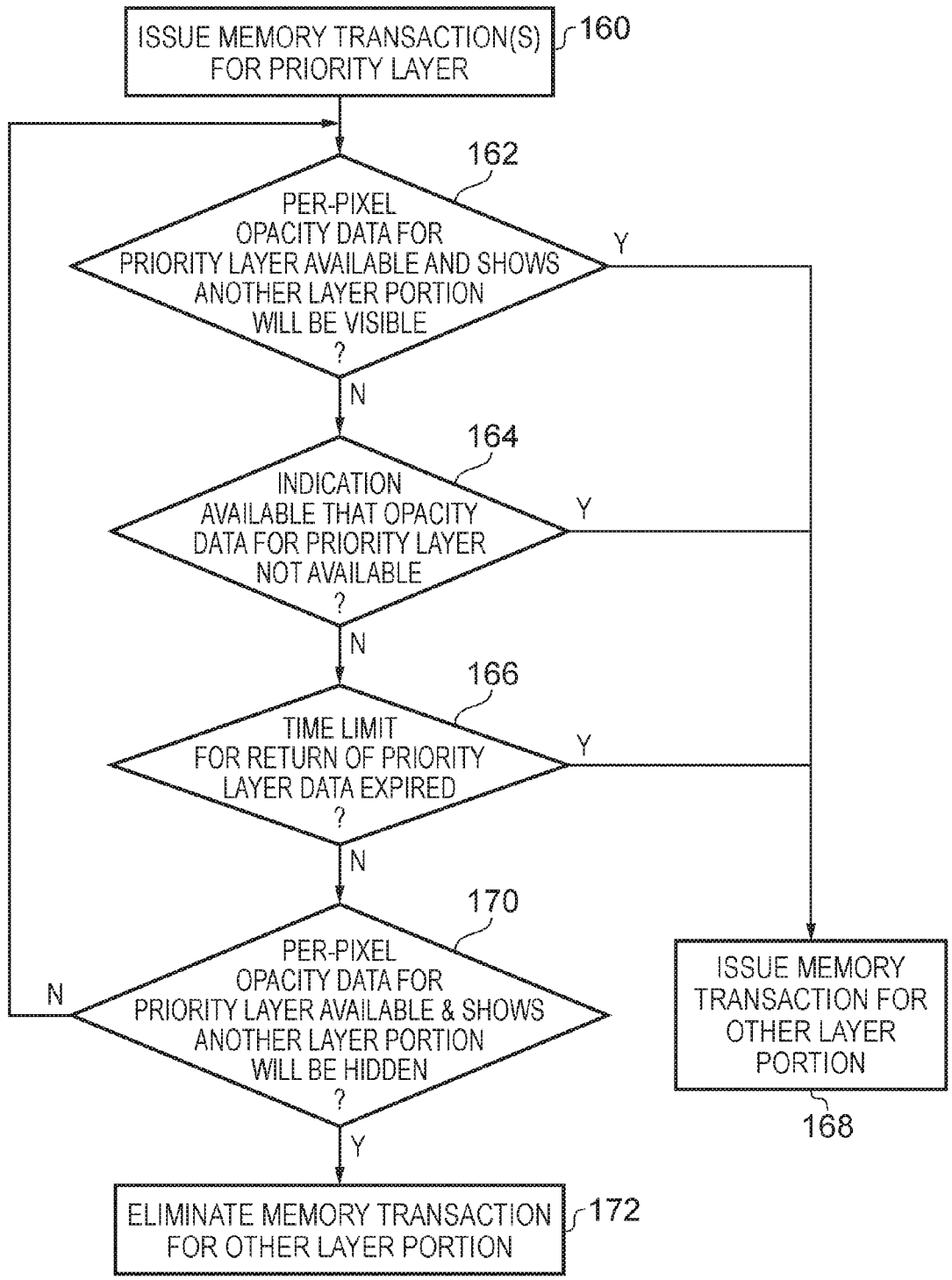
FIG. 8 shows a sequence of steps which are taken in one example embodiment when determining which memory transactions may be eliminated.

FIG. 8 shows a sequence of steps via which the elimination of some memory transactions is performed. The flow shown begins at step 160, where one or more memory transactions are issued for the "priority" layer (i.e. a layer allocated to an extended latency buffer) and then at step 162 it is determined if the per-pixel opacity data for this priority layer is available in the image data returned and furthermore that it shows a portion of another layer will nevertheless be visible. If this is true then the flow proceeds to step 168, where a memory transaction for that other layer portion is issued. If however, at step 162 this is not the case then at step 164 it is determined if there is some indication available that the opacity data for the priority layer is not available. If this is the case then the flow also proceeds to step 168 for the memory transaction for the other layer portion to be issued. If however no such indication is available then at step 166 it is determined if the time limit for the return of the priority layer data has expired. If this is the case then this also causes the flow to proceed to step 168 for a memory transaction for the other layer portion to be issued. Finally, if the time limit has not expired then at step 170 it is determined if the per-pixel opacity data for the priority layer is now available and does show that another layer portion will be hidden. If so the flow proceeds to step 172, where a memory transaction for that other layer portion that will be hidden is eliminated. Otherwise, from step 170 the flow returns to step 162.

In brief overall summary an apparatus and a corresponding method for processing image data are provided. The apparatus has compositing circuitry to generate a composite layer for a frame for display from image data representing plural layers of content within the frame. Plural latency buffers are provided to store at least a portion of the image data representing the plural layers. At least one of the plural latency buffers is larger than at least one other of the plural latency buffers. The compositing circuitry is responsive to at least one characteristic of the plural layers of content to allocate the plural layers to respective latency buffers of the plural latency buffers. Image data information for a layer allocated to the larger latency buffer is available for analysis earlier than that of the layers allocated to the smaller latency buffers and processing efficiencies can then result.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus for processing image data comprising:
    compositing circuitry to generate a composite layer for a frame for display from image data representing plural layers of content within the frame; and
    plural latency buffers to store at least a portion of the image data representing the plural layers, wherein at least one of the plural latency buffers is larger than at least one other of the plural latency buffers,
    and wherein the compositing circuitry is responsive to at least one characteristic of the plural layers of content to allocate the plural layers to respective latency buffers of the plural latency buffers.

2. The apparatus as claimed in claim 1, wherein the compositing circuitry is responsive to the at least one characteristic of a selected layer of the plural layers of content indicating that the selected layer may obscure at least a portion of another layer of the plural layers of content to allocate the selected layer to one of the plural latency buffers which is larger than at least one other of the plural latency buffers.

3. The apparatus as claimed in claim 1, wherein the at least one other of the plural latency buffers has a size proportional to a horizontal line size of a layer, and the at least one of the plural latency buffers which is larger has a size corresponding to a multiple of the horizontal line size of the layer.

4. The apparatus as claimed in claim 1, comprising data fetching circuitry to issue memory transactions to retrieve the image data representing the plural layers of content from memory to the plural latency buffers, and the compositing circuitry is responsive to opacity information derived from the image data representing the plural layers of content to cause at least one memory transaction to be eliminated before it is issued.

5. The apparatus as claimed in claim 4, wherein the data fetching circuitry is arranged to implement a delay for issuing memory transactions for image data for a smaller latency buffer until the opacity information for a larger latency buffer is available to the compositing circuitry.

6. The apparatus as claimed in claim 5, wherein the data fetching circuitry is arranged to implement the delay when the smaller latency buffer and the larger latency buffer cover a same region of the frame.

7. The apparatus as claimed in claim 5, wherein the data fetching circuitry is responsive to retrieval of the image data for a larger latency buffer taking at least a predetermined time to abort the delay and to issue the memory transactions for the image data for the smaller latency buffer.

8. The apparatus as claimed in claim 5, wherein the data fetching circuitry is responsive to an indication that the opacity information is not available for the image data for the larger latency buffer to abort the delay and to issue the memory transactions for the image data for the smaller latency buffer.

9. The apparatus as claimed in claim 5, wherein the data fetching circuitry is responsive to an indication that the memory is currently handling more than a threshold number of memory transactions to abort the delay and to issue the memory transactions for the image data for the smaller latency buffer.

10. The apparatus as claimed in claim 1, comprising data fetching circuitry responsive to current display line information for the frame being displayed to issue memory transactions to retrieve the image data from the memory to the plural latency buffers for display lines in advance of the display of those display lines by an advance amount which depends on a respective size of the latency buffer to which it will be stored.

11. The apparatus as claimed in claim 1, wherein the at least one characteristic comprises, for at least one layer of the plural layers, at least one of:
per-pixel opacity information;
an image format;
an image compression support;
an image compression format;
a data size;
an indicated priority;
a number of pixels covered;
a proportion of the frame covered;
a geometric processing indicator;
a layer ordering;
an extent of layer overlap; and
an indicated content type.

12. The apparatus as claimed in claim 4, comprising meta-data storage to store meta-data derived from the image data representing the plural layers of content, wherein the meta-data comprises the opacity information.

13. The apparatus as claimed in claim 12, wherein the meta-data is not generated for regions of the frame where the plural layers do not overlap.

14. The apparatus as claimed in claim 4, wherein the compositing circuitry is responsive to arrival of the image data representing the plural layers of content to generate meta-data from the image data representing the plural layers of content, wherein the meta-data comprises the opacity information.

15. The apparatus as claimed in claim 4, wherein the plural latency buffers comprise pixel annotation circuitry to hold indications of pixels for which no image data was retrieved because a corresponding memory transaction was eliminated, and the apparatus further comprises display processing pipeline circuitry to process the image data for display, wherein the display processing pipeline circuitry comprises further pixel annotation circuitry to propagate the indications through the display processing pipeline circuitry as the image data is processed.

16. The apparatus as claimed in claim 15, wherein the pixel annotation circuitry and further pixel annotation circuitry comprise a sequence of flip-flops.

17. The apparatus as claimed in claim 15, wherein the display processing pipeline circuitry is responsive to the indications of pixels for which no image data was retrieved held by the pixel annotation circuitry to propagate null pixels through the display processing pipeline circuitry for the pixels for which no image data was retrieved.

18. The apparatus as claimed in claim 15, wherein the display processing pipeline circuitry is responsive to the indications of pixels for which no image data was retrieved held by the pixel annotation circuitry to propagate an indication of a number of missing pixels through the display processing pipeline circuitry for the pixels for which no image data was retrieved.

19. The apparatus as claimed in claim 4, wherein the compositing circuitry is responsive to at least one geometric processing indicator derived from the image data representing the plural layers of content indicating that at least one of the plurality of layers will be subjected to geometric processing to suppress elimination of memory transactions for the plurality of layers.

20. The apparatus as claimed in claim 1, comprising a reorder buffer to reorder the image data representing the plural layers of content from memory when the image data is returned from the memory in a different order to that in which it was requested.

21. The apparatus as claimed in claim 1, comprising one random access memory in which more than one of the plural latency buffers are implemented.

22. The apparatus as claimed in claim 1, comprising plural random access memories in which the plural latency buffers are implemented.

23. The apparatus as claimed in claim 1, comprising plural random access memories in which one of the plural latency buffers is implemented.

24. A method of processing image data comprising:
compositing image data representing plural layers of content within a frame to generate a composite layer for the frame for display;
storing at least a portion of the image data representing the plural layers in plural latency buffers, wherein at least one of the plural latency buffers is larger than at least one other of the plural latency buffers; and
responding to at least one characteristic of the plural layers of content to allocate the plural layers to respective latency buffers of the plural latency buffers.

25. Apparatus for processing image data comprising:
means for compositing image data representing plural layers of content within a frame to generate a composite layer for the frame for display;
means for storing at least a portion of the image data representing the plural layers in plural latency buffers, wherein at least one of the plural latency buffers is larger than at least one other of the plural latency buffers; and
means for responding to at least one characteristic of the plural layers of content to allocate the plural layers to respective latency buffers of the plural latency buffers.

* * * * *